United States Patent
Seo et al.

(10) Patent No.: US 10,621,951 B2
(45) Date of Patent: Apr. 14, 2020

(54) HEAD MOUNT DISPLAY DEVICE AND DRIVING METHOD OF THE SAME

(71) Applicant: Samsung Display Co., Ltd., Yongin-Si, Gyeonggi-Do (KR)

(72) Inventors: Young-Jun Seo, Suwon-si (KR); Hyosun Kim, Seongnam-si (KR); Rangkyun Mok, Seoul (KR); Yongwoo Yi, Hwaseong-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 16/205,470

(22) Filed: Nov. 30, 2018

(65) Prior Publication Data

US 2019/0180716 A1 Jun. 13, 2019

(30) Foreign Application Priority Data

Dec. 13, 2017 (KR) .................. 10-2017-0171094

(51) Int. Cl.
  *G09G 5/10* (2006.01)
  *G02B 27/01* (2006.01)
  *G09G 3/20* (2006.01)

(52) U.S. Cl.
  CPC ............. *G09G 5/10* (2013.01); *G02B 27/017* (2013.01); *G09G 3/20* (2013.01); *G02B 2027/014* (2013.01); *G02B 2027/0118* (2013.01); *G09G 2310/08* (2013.01); *G09G 2320/0606* (2013.01); *G09G 2320/0626* (2013.01); *G09G 2320/0673* (2013.01); *G09G 2320/08* (2013.01);

(Continued)

(58) Field of Classification Search
CPC ................. G09G 5/10; G09G 2320/08; G09G 2320/062; G09G 2320/0673; G09G 2360/144; G02B 27/01; G02B 27/017; G02B 2027/0118; G02B 2027/014
See application file for complete search history.

(56) References Cited

U.S. PATENT DOCUMENTS

2009/0058887 A1* 3/2009 Lin .................... G06F 3/14
  345/690
2011/0181567 A1* 7/2011 Tanba ................ G09G 5/00
  345/207

(Continued)

FOREIGN PATENT DOCUMENTS

KR 1020160125272 A 10/2016
WO 2011159695 A1 12/2011

*Primary Examiner* — Dong Hui Liang
(74) *Attorney, Agent, or Firm* — Cantor Colburn LLP

(57) ABSTRACT

A head mount display device includes a display panel which displays image based on an image signal, a calculator which calculates an initial image luminance and a watching image luminance based on an equation "$\log(Lth) = c_1 \log(La) + c_2 \log(w) + c_3$, where Lth is a determination luminance, La is an adaptive environment luminance, w is an offset, c1 is a first constant, c2 is a second constant, and c3 is a third constant" that is a modelling for a relationship of an adaptive environment luminance in which eyes of a user are adapted and a determination luminance in which the eyes of the user do not recognize a discomfort, and a luminance controller which changes the initial image luminance of the image to the watching image luminance during an adaptive time.

20 Claims, 5 Drawing Sheets

(52) U.S. Cl.
CPC ... *G09G 2354/00* (2013.01); *G09G 2360/144* (2013.01); *G09G 2360/16* (2013.01)

(56) References Cited

U.S. PATENT DOCUMENTS

| | | | | |
|---|---|---|---|---|
| 2013/0113973 | A1* | 5/2013 | Miao | G09G 3/003 348/333.01 |
| 2013/0147864 | A1* | 6/2013 | Kim | G09G 3/3607 345/691 |
| 2013/0278631 | A1* | 10/2013 | Border | G02B 27/017 345/633 |
| 2014/0320552 | A1* | 10/2014 | Seo | G09G 3/3648 345/690 |
| 2015/0049003 | A1* | 2/2015 | Fujimaki | G02B 27/0172 345/8 |
| 2015/0070773 | A1* | 3/2015 | Wang | G02B 27/0176 359/631 |
| 2015/0168723 | A1* | 6/2015 | Eto | H04N 9/73 348/51 |
| 2016/0091877 | A1* | 3/2016 | Fullam | G05B 15/02 700/276 |
| 2016/0314762 | A1* | 10/2016 | Lee | G09G 3/001 |

\* cited by examiner

HEAD MOUNT DISPLAY DEVICE AND DRIVING METHOD OF THE SAME

This application claims priority to Korean Patent Application No. 10-2017-0171094, filed on Dec. 13, 2017, and all the benefits accruing therefrom under 35 U.S.C. § 119, the content of which in its entirety is herein incorporated by reference.

BACKGROUND

1. Field

Exemplary embodiments relate generally to a head mount display device and a driving method of the same.

2. Description of the Related Art

A head mount display ("HMD") device refers to a digital device that is mounted on a user's head and receives a various multimedia contents. Various wearable computers are developed as a weight and a size of the digital device decreases. The HMD device is widely used as the digital device. The HMD device is operated nearby user's eyes because the HMD device is mounted on the user's head. Recently, a method for decreasing a fatigue of the user's eyes is studied.

SUMMARY

Some exemplary embodiments provide a head mount display ("HMD") device capable of decreasing a fatigue of eyes of a user.

Some exemplary embodiments provide a driving method of the HMD device capable of decreasing a fatigue of eyes of a user.

According to an exemplary embodiment of exemplary embodiments, an HMD device may include a display panel which displays image based on an image signal, a calculator which calculates an initial image luminance and a watching image luminance based on an equation "$\log(Lth)=c_1 \log(La)+c_2 \log(w)+c_3$, where Lth is a determination luminance, La is an adaptive environment luminance, w is an offset, c1 is a first constant, c2 is a second constant, and c3 is a third constant" that is a modelling for a relationship of an adaptive environment luminance in which eyes of a user are adapted and a determination luminance in which the eyes of the user do not recognize a discomfort, and a luminance controller which changes the initial image luminance of the image to the watching image luminance during an adaptive time.

In exemplary embodiments, the HMD device may further include a sensor which measures an intensity of luminance of a surrounding environment.

In exemplary embodiments, the calculator may calculate the initial image luminance based on the intensity of the luminance of the surrounding environment measured from the sensor.

In exemplary embodiments, the calculator may determine the determination luminance calculated by adapting the intensity of the luminance to the adaptive environment luminance as the initial image luminance.

In exemplary embodiments, the calculator may calculate the initial image luminance based on an equation "$\log(L1)=0.904 \log(Le)+0.16 \log(w)+0.07$, where L1 is the initial image luminance, Le is the intensity of the luminance of the surrounding environment".

In exemplary embodiments, the HMD device may further include a luminance determiner which stores a plurality of user luminance and receive a selection signal of the user who selects one of the user luminance.

In exemplary embodiments, the calculator may calculate the initial image luminance based on the one of user luminance selected by the user.

In exemplary embodiments, the calculator may determine the determination luminance calculated by adapting the user luminance to the adaptive environment luminance as the initial image luminance.

In exemplary embodiments, the calculator may calculate the initial image luminance based on an equation "$\log(L1)=0.904 \log(Lu)+0.16 \log(w)+0.07$, where L1 is the initial image luminance, Lu is the user luminance".

In exemplary embodiments, the calculator may determine the determination luminance calculated by adapting the initial image luminance to the adaptive environment luminance as the watching image luminance.

In exemplary embodiments, the calculator may calculate the watching image luminance based on an equation "$\log(L2)=0.547 \log(L1)+0.15 \log(w)+1.09$, where L2 is the watching image luminance, L1 is the initial image luminance.

In exemplary embodiments, the HMD device may further include a timing controller coupling to the luminance controller, where the timing controller stores a plurality of gamma data sets.

In exemplary embodiments, the timing controller may select at least one gamma data set based on a luminance control signal output from the luminance controller.

In exemplary embodiments, the plurality of gamma data sets may be stored as a lookup table ("LUT").

In exemplary embodiments, the timing controller may count the adaptive time based on a vertical synchronization signal.

In exemplary embodiments, the adaptive time may be less than about 2 minutes.

According to an exemplary embodiment of exemplary embodiments, a driving method of an HMD device may include an operation of calculating an initial image luminance of an image based on an equation "$\log(Lth)=c_1 \log(La)+c_2 \log(w)+c_3$, where Lth is a determination luminance, La is an adaptive environment luminance, w is an offset, c1 is a first constant, c2 is a second constant, and c3 is a third constant" that is a modelling for a relation of an adaptive environment luminance in which eyes of a user adapted and a determination luminance in which the eyes of the user do not recognize a discomfort, an operation of calculating a watching image luminance of the image based on the equation "$\log(Lth)=c_1 \log(La)+c_2 \log(w)+c_3$", and changing the initial image luminance to the watching image luminance during an adaptive time.

In exemplary embodiments, the driving method of an HMD device may further include an operation of measuring an intensity of luminance of a surrounding environment. The initial image luminance may be calculated based on an equation "$\log(L1)=0.904 \log(Le)+0.16 \log(w)+0.07$, where L1 is the initial image luminance, Le is the intensity of the luminance of the surrounding environment".

In exemplary embodiments, the driving method of an HMD device may further include an operation of receiving a user luminance selected by a user. The initial image luminance may be calculated based on an equation "$\log(L1)=0.904 \log(Lu)+0.16 \log(w)+0.07$, where L1 is the initial image luminance, Lu is the user luminance".

In exemplary embodiments, the watching image luminance may be calculated based on an equation "$\log(L2)=0.547 \log(L1)+0.15 \log(w)+1.09$, where L2 is the watching image luminance, L1 is the initial image luminance".

Therefore, the HMD device and the driving method of the HMD device may decrease a discomfort and a fatigue of eyes of a user by calculating the initial image luminance based on the intensity of luminance of the surrounding environment or the user luminance using an equation "$\log(Lth)=c_1 \log(La)+c_2 \log(w)+c_3$" that is a modelling for the relationship of the adaptive environment luminance and the determination luminance, calculating the watching image luminance based on the initial image luminance, and changing the luminance of the image from the initial image luminance to the watching image luminance during the predetermined adaptive time when the user watches an image on the HMD device.

BRIEF DESCRIPTION OF THE DRAWINGS

Illustrative, non-limiting exemplary embodiments will be more clearly understood from the following detailed description taken in conjunction with the accompanying drawings.

DETAILED DESCRIPTION

Figure 1:
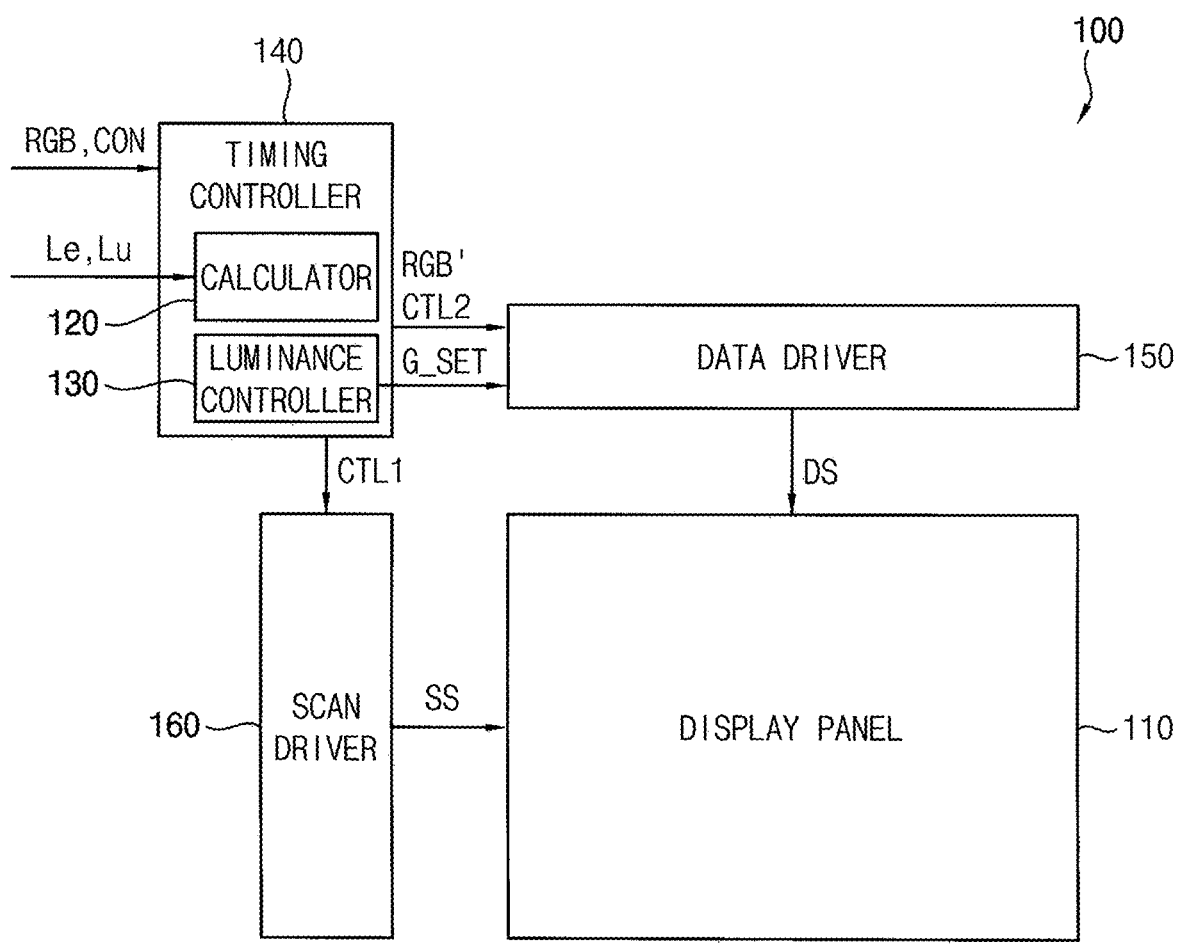
FIG. 1 is a block diagram illustrating an exemplary embodiment of a head mount display ("HMD") device.

Hereinafter, the invention will be explained in detail with reference to the accompanying drawings in which various embodiments are shown. This invention may, however, be embodied in many different forms, and should not be construed as limited to the embodiments set forth herein. Rather, these embodiments are provided so that this invention will be thorough and complete, and will fully convey the scope of the invention to those skilled in the art. Like reference numerals refer to like elements throughout.

It will be understood that when an element is referred to as being "on" another element, it can be directly on the other element or intervening elements may be therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. In an exemplary embodiment, when the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, when the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. In an exemplary embodiment, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

FIG. 1 is a block diagram illustrating a head mount display ("HMD") device according to exemplary embodiments.

Referring to FIG. 1, an HMD device 100 may include a display panel 110, a calculator 120, and a luminance controller 130. Further, the MID device 100 may include a data driver 150, a scan driver 160, and a timing controller 140. Here, the calculator 120 and the luminance controller 130 may be located in the timing controller 140. In an alternative exemplary embodiment, the calculator 120 and the luminance controller 130 may be coupled to the timing controller 140.

The display panel 110 may display an image based on an image signal RGB. The display panel 110 may include a plurality of data lines, a plurality of scan lines, and a plurality of pixels. In an exemplary embodiment, the each of the pixel included in the display panel 110 may include a thin film transistor ("TFT") coupled to the data line and the scan line, and a liquid crystal capacitor and a storage capacitor coupled to the TFT when the display part is implemented as a liquid crystal display ("LCD") device, for example. Each of the pixels included in the display panel 110 may include a TFT coupled to the data line and the scan line, a storage capacitor coupled to the TFT, a driving transistor (e.g., a TFT), and an organic light emitting diode coupled to the driving transistor.

Generally, a display device may control luminance of the display device according to a watching environment of a user such as an intensity of luminance of a surrounding environment to improve display quality. In an exemplary embodiment, the display device may increase the luminance to improve a visibility in an external environment in which the intensity of luminance is high, for example. In an alternative exemplary embodiment, the display device may decrease the luminance to decrease a fatigue of eyes of the user in an internal environment in which the intensity of luminance is low or at night. The user may sensitively response to the fatigue of eyes, a dazzling when the user wears the HMD device 100 because the user watches the display part closely. Further, the HMD device 100 may be operated in a different environment (i.e., an environment having a low intensity of luminance) because the MID device 100 blocks out light. The HMD device 100 according to exemplary embodiments may decrease the fatigue of eyes of the user and improve the display quality by differently controlling the luminance of the MID device 100 from the general display device. Hereinafter, the MID device 100 according to exemplary embodiments will be described in detail.

The timing controller 140 may receive the image signal RGB and a control signal CON from an external device. The timing controller 140 may selectively perform a display quality correction, an adaptive color correction ("ACC"), a dynamic capacitance compensation ("DCC"), etc., to the image signal RGB and output the image data RGB' to the data driver. In an alternative exemplary embodiment, the timing controller 140 may output the image signal RGB provided from the external device to the data driver as it is. The control signal CON may include a horizontal synchronization signal, a vertical synchronization signal, and a clock signal. The timing controller 140 may generate a horizontal start signal using the horizontal synchronization signal. The timing controller 140 may generate a vertical start signal using the vertical synchronization signal. The timing controller 140 may generate a first clock signal and a second clock signal using the clock signal. The timing controller 140 may provide the vertical start signal and the first clock signal to the scan driver 160 as a first control signal CTL1. The timing controller 140 may provide the horizontal start signal and the second clock signal to the data driver 150 as a second control signal CTL2.

The timing controller 140 may include the calculator 120 and a luminance controller 130. In an alternative exemplary embodiment, the timing controller 140 may be coupled to the calculator 120 and the luminance controller 130.

The calculator 120 may calculate an initial image luminance and a watching image luminance of the image based on an Equation 1 that is modellings for a relationship of an adaptive environment luminance in which eyes of the user are adapted and a determination luminance in which the eyes of the user do not recognize a discomfort.

$$\log(Lth) = c_1 \log(La) + c_2 \log(w) + c_3 \qquad \text{<Equation 1>}$$

Where Lth is the determination luminance, La is the adaptive environment luminance, w is an offset, c1 is a first constant, c2 is a second constant, and c3 is a third constant.

The calculator 120 may calculate the initial image luminance and the watching image luminance based on the Equation 1 that is a modelling for the relationship of the adaptive environment luminance and the determination luminance. The adaptive environment luminance may represent luminance of an environment to which the eyes of the user adapted. That is, the adaptive environment luminance may be the luminance of the environment in which the eyes of the user is exposed. In an exemplary embodiment, an intensity of luminance of a surrounding environment Le may be the adaptive environment luminance before the user wears the HMD device 100 because the eyes of the user is adapted to the surrounding environment before the user wears the HMD device 100, for example. Further, in a case that the user wears the HMD device 100 and an image having a first luminance is displayed on the display panel 110 during Mth frame and an image having a second luminance is displayed on the display panel 110 after Mth frame, the first luminance may be the adapted environment luminance for calculating the determination luminance after Mth frame because the eyes of the user is adapted to the first luminance. The determination luminance may represent the luminance in which the user does not recognize the discomfort. Eyes of a human may adapted to an environment as time passes when the environment (i.e., luminance) is changed. However, the user may feel discomfort (e.g., dazzling) when the environment is rapidly changed and fatigue when the user stay in an environment hard to be adapted. The Equation 1 is an equation that is a modelling for the relationship of the adaptive environment luminance in which the eyes of the user is adapted and the determination luminance in which the user does not recognize the discomfort based on a discomfort threshold at which the user feels the discomfort or does not adapted to the luminance change.

The calculator 120 may calculate the initial image luminance and the watching image luminance based on the Equation 1. The initial image luminance may represent a luminance of an image displayed on the display part immediately after the user wears the HMD device 100. In some exemplary embodiments, the initial image luminance may be calculated based on the intensity of luminance Le of the surrounding environment. The HMD device 100 may further include a sensor for measuring the intensity of luminance Le of the surrounding environment. The calculator 120 may determine the determination luminance calculated by adapting the intensity of luminance Le of the surrounding environment measured by the sensor to the adapted environment luminance of the Equation 1 as the initial image luminance. In other exemplary embodiments, the initial image luminance may be calculated based on a user luminance Lu to which the user input. The HMD device 100 may further include a user luminance determiner that stores a plurality of user luminance Lu and receives a selection signal of the user who selects one of the user luminance. The calculator 120 may determine the determination luminance calculate by adapting the user luminance Lu provided from the user luminance determiner to the adaptive environment luminance of the Equation 1 as the initial image luminance. The user may not recognize the discomfort such as the dazzling occurs by a rapid change of the luminance when an image having the initial image luminance is displayed on the HMD device 100.

The watching image luminance may represent luminance of an image displayed on the display panel 110 of the HMD device 100 after a predetermined adaptive time. The calculator 120 may determine the determination luminance calculated by adapting the initial image luminance to the adaptive environment luminance of the Equation 1 as the watching image luminance. The user may not feel fatigue although the user watches the display panel 110 of the HMD device 100 for a long time when the image having the watching image luminance is displayed on the display panel 110 of the HMD device 100 after the adaptive time.

Referring to Equation 1, the w represents the offset by the display panel 110. The w may be changed by a color property of the display panel 110, a kind of the display panel 110 (e.g., the LCD device, the organic light emitting display ("OLED") device), a driving frequency, etc. The c1, c2, and c3 may be the predetermined constant. Referring to a Chart 1, the c1, c2, and c3 may be different when the calculator 120 calculates the initial image luminance and the watching image luminance.

CHART 1

|  | $c_1$ | $c_2$ | $c_3$ |
|---|---|---|---|
| INITIAL IMAGE LUMINANCE | 0.904 | 0.16 | 0.07 |
| WATCHING IMAGE LUMINANCE | 0.547 | 0.15 | 1.09 |

The luminance controller 130 may change the initial image luminance of the image to the watching image luminance during the predetermined adaptive time. The timing controller 140 may store a plurality of gamma data sets. Here, the gamma data sets may be stored as a look up table ("LUT"). The timing controller 140 may select and output the gamma data set G_SET based on a luminance control signal output from the luminance controller 130. The gamma data set G_SET may be provided to the data driver 150 that generates gamma voltages. The data driver 150 may generate the gamma voltages based on the gamma data set G_SET. The luminance controller 130 may generate the luminance control signal that outputs the LUT corresponding to the initial image luminance calculated in the calculator 120. The luminance controller 130 may generate the luminance control signal that changes the luminance of the image from the initial image luminance to the watching image luminance during the predetermined adaptive time. The luminance controller 130 may sequentially change the luminance of the image. The luminance controller 130 may count the adaptive time based on the vertical synchronization signal provided to the timing controller 140. In an exemplary embodiment, the vertical synchronization signal may be provided 60 times during a second when the HMD device 100 is driven at 60 Hertz (Hz), for example. The luminance controller 130 may sequentially change the luminance of the image from the initial image luminance to the watching image luminance while the vertical synchronization signal is provided about 7200 times when the adaptive time is about 2 minutes. In an exemplary embodiment, the luminance controller 130 may provide the luminance control signal when the vertical synchronization signal is provided, for example. The data driver 150 may provide the gamma data set G_SET corresponding to the luminance control signal. The luminance controller 130 may change the luminance of the image from the initial image luminance to the watching image luminance during the adaptive time. Thus, the user may not recognize the discomfort The data driver 150 may generate the gamma voltages based on the gamma data set G_SET provided from the timing controller 140. The data driver 150 may output the data signal DS in response to the second control signal CTL2 provided from the timing controller 140. The data driver 150 may output the gamma voltage corresponding to the image data as the data signal DS to the data line in response to the horizontal start signal and the second clock signal.

The scan driver 160 may generate the scan signal SS based on the first control signal CTL1 provided from the timing controller 140. The scan driver 160 may generate the scan signal SS in response to the vertical start signal and the first clock signal and output the scan signal SS to the scan line.

As described above, the HMD device 100 according to the exemplary embodiments may decrease the discomfort of the eyes and the fatigue of the user by calculating the initial image luminance based on the intensity of luminance of the surrounding environment and the user luminance, calculating the watching image luminance based on the initial image luminance, and changing the luminance of the image from the initial image luminance to the watching image luminance during the predetermined adaptive time.

Figure 2:
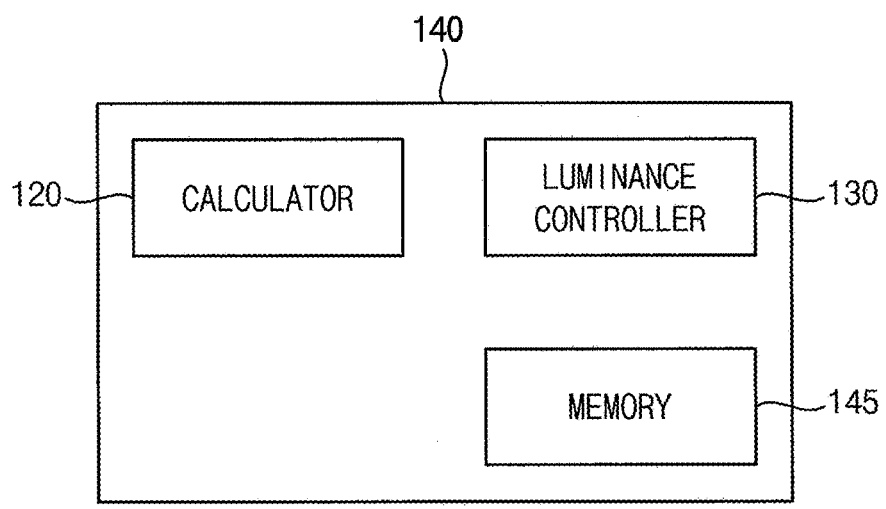
FIG. 2 is a diagram illustrating a timing controller included in the MID device of FIG. 1.
Figure 3A:
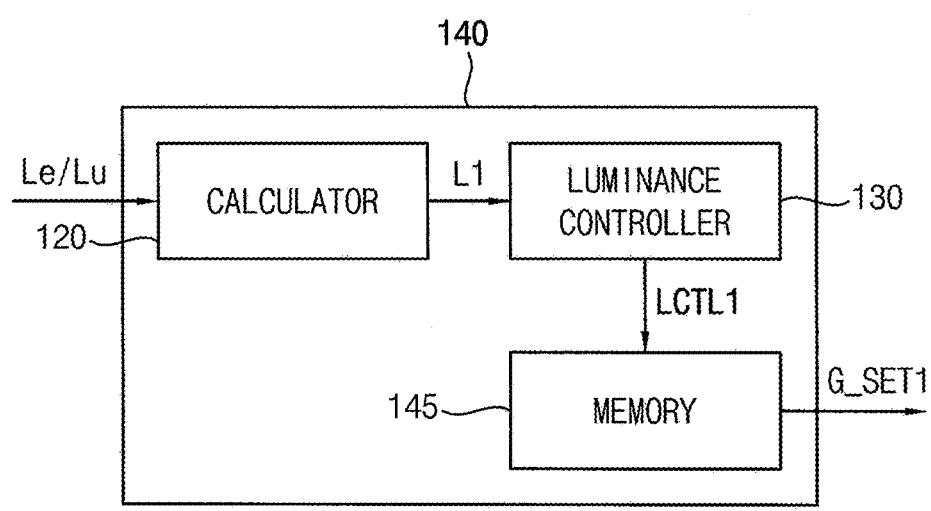
FIGS. 3A and 3B are block diagrams for describing an operating of the timing controller of FIG. 2.
Figure 3B:
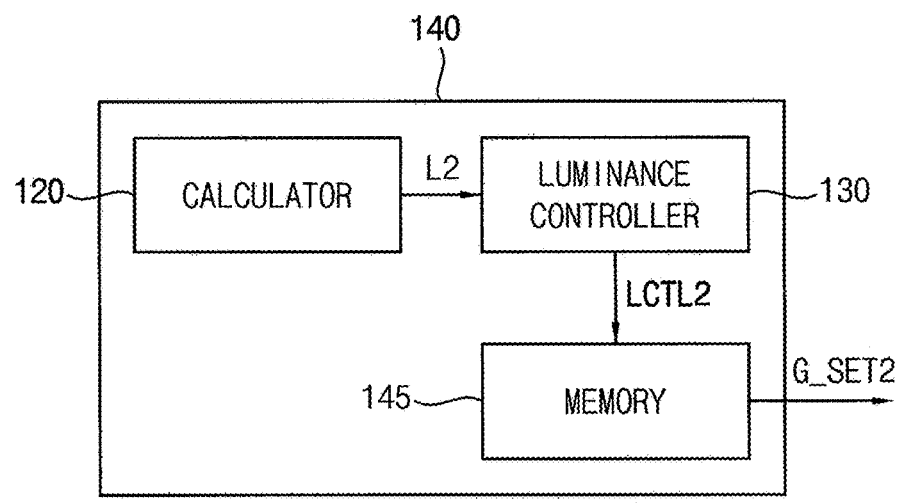

FIG. 2 is a diagram illustrating a timing controller included in the HMD device of FIG. 1 and FIGS. 3A and 3B are block diagrams illustrating for describing an operating of the timing controller of FIG. 2.

Referring to FIG. 2, the timing controller 140 may include the calculator 120, the luminance controller 130, and the memory 145.

The calculator 120 may calculate the initial image luminance and the watching image luminance based on the Equation 1 that is a modelling for a relationship of the adaptive environment luminance and the determination luminance. The calculator 120 may calculate the initial image luminance based on the intensity of luminance of the surrounding environment or the user luminance. Further, the calculator 120 may calculate the watching image luminance based on the initial image luminance.

The initial image luminance and the watching image luminance provided from the calculator 120 may be provided to the luminance controller 130. The luminance controller 130 may output the luminance control signal corresponding to the initial image luminance and the watching image luminance. Further, the luminance controller 130 may output the luminance control signal that changes the initial image luminance to the watching image luminance during the adaptive time.

The memory 145 may store the plurality of gamma data sets. The gamma data set may be provided to the data driver and determine the gamma voltage between gamma reference voltages. The gamma voltage may be changed by the gamma data set. Thus, the luminance of the image may be changed based on the gamma voltage.

Referring to FIGS. 3A and 3B, the calculator 120 may receive the intensity of luminance Le of the surrounding environment or the user luminance Lu. In some exemplary embodiments, the HMD device may include the sensor that measures the intensity of luminance Le of the surrounding environment. The calculator 120 may receive the intensity of luminance Le of the surrounding environment measured by the sensor when the user wears the HMD device. The calculator 120 may calculate the initial image luminance L1 based on the intensity of luminance Le of the surrounding environment. Specifically, the calculator 120 may determine the determination luminance calculated by adapting the intensity of luminance Le of the surrounding environment to the adaptive environment luminance of the Equation 1 as the initial image luminance L1. Further, the calculator 120 may adapt the constant c1, c2, and c3 of the initial image luminance L1 in the Chart 1 to the Equation 1. That is, the calculator 120 may calculate the initial image luminance L1 of the image based on an Equation 2.

$$\log(L1)=0.904 \log(Lu)+0.16 \log(w)+0.07, \qquad \text{<Equation 2>}$$

Where L1 is the initial image luminance, and Le is the intensity of luminance of the surrounding environment.

In other exemplary embodiments, the HIVID device may further include the user luminance determiner that stores the plurality of user luminance Lu and receives the selection signal of the user who selects one of the user luminance. The calculator 120 may receive the user luminance Lu corresponding to the selection signal of the user. The calculator 120 may calculate the initial image luminance L1 based on the user luminance Lu. Specifically, the calculator 120 may determine the determination luminance calculated by adapting the user luminance Lu to the adaptive environment luminance of the Equation 1 as the initial image luminance L1. Further, the calculator 120 may adapt the constant c1, c2, and c3 of the initial image luminance L1 in the Chart 1 to the Equation 1. That is, the calculator may calculate the initial image luminance L1 of the image based on an Equation 3.

$$\log(L1)=0.904 \log(Lu)+0.16 \log(w)+0.07, \qquad \text{<Equation 3>}$$

Where L1 is the initial image luminance L1, and Lu is the user luminance Lu.

The luminance controller 130 may output a first luminance control signal LCTL1 based on the initial image luminance L1 provided from the calculator 120. A first gamma data set G_SET1 corresponding to the first luminance control signal LCTL1 among the plurality of gamma data sets stored in the memory 145 may be output.

Referring to FIG. 3B, the calculator 120 may store the initial image luminance L1 and calculate the watching image luminance L2 based on the initial image luminance L1. The calculator 120 may determine the determination luminance calculated by adapting the initial image luminance L1 to the adaptive environment luminance of the Equation 1 as the watching image luminance L2. Further, the calculator 120 may adapt the constant c1, c2, and c3 of the watching image luminance L2 in the Chart 1 to the Equation 1. That is, the calculator 120 may calculate the watching image luminance L2 of the image based on an Equation 4.

$$\log(L2)=0.547 \log(L1)+0.15 \log(w)+1.09, \qquad \text{<Equation 4>}$$

Where L2 is the watching image luminance L2, and L1 is the initial image luminance.

The luminance controller 130 may output a second luminance control signal LCTL2 based on the watching image luminance L2 provided from the calculator 120. A second gamma data set G_SET2 corresponding to the second luminance control signal LCTL2 among the plurality of gamma data sets stored in the memory 145 may be output.

The luminance controller 130 may output the first luminance control signal LCTL1 to output the first gamma data set G_SET1, and may output the second luminance control signal LCTL2 as the predetermined adaptive time passes. The luminance controller 130 may output the luminance control signals to sequentially change the initial image luminance L1 to the watching image luminance L2 during the predetermined adaptive time.

Figure 4:
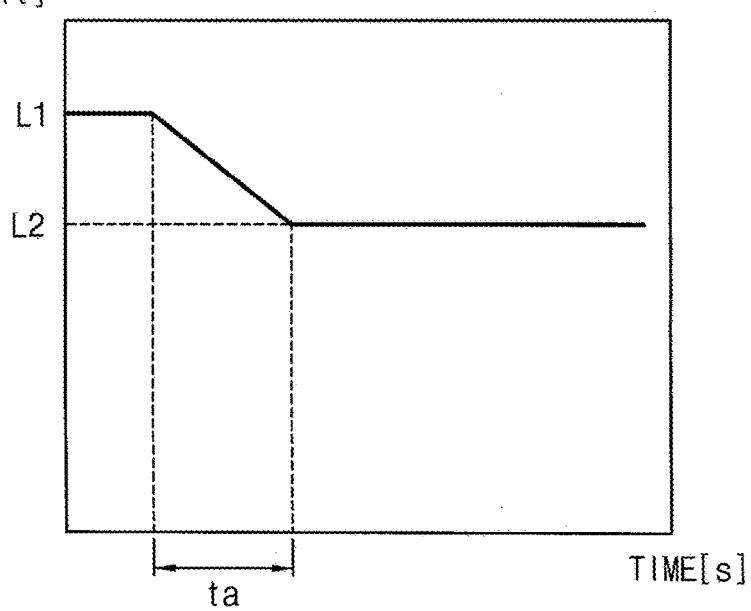
FIG. 4 is a diagram illustrating for describing an operation of a controller included in the timing controller of FIG. 2.

FIG. 4 is a diagram illustrating for describing an operation of a controller included in the timing controller of FIG. 2.

Referring to FIG. 4, the HMD device may change the initial image luminance L1 to the watching image luminance L2 during the adaptive time ta. The luminance controller may output the luminance control signal that changes the initial image luminance L1 to the watching image luminance L1 during the predetermined adaptive time ta. The luminance controller may count the adaptive time ta based on the synchronization signal provided from the timing controller. In some exemplary embodiments, the adaptive time may be within about 2 minutes. The luminance controller may outputs the luminance control signals that sequentially changes the initial image luminance L1 to the watching image luminance L2 during the adaptive time ta. The gamma data sets corresponding to the luminance control signals among the plurality of gamma data sets stored in the memory may be output during the adaptive time.

Figure 5:
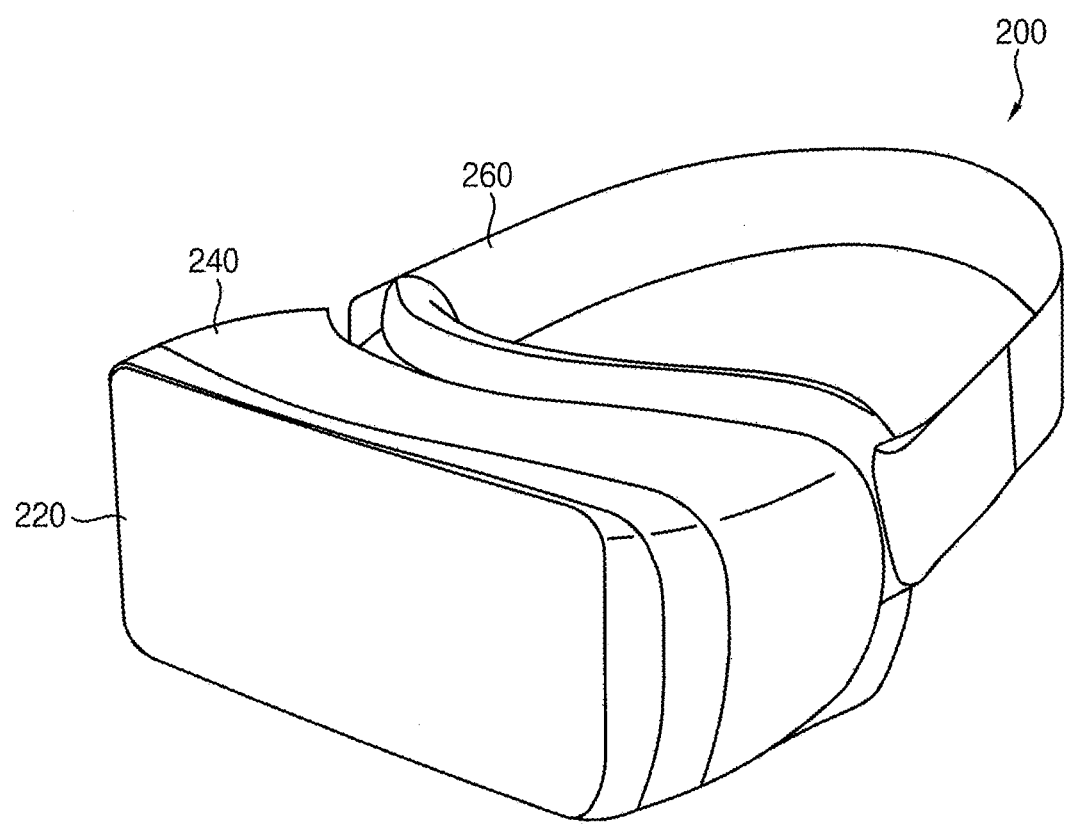
FIG. 5 is a diagram illustrating the MID device of FIG. 1.

FIG. 5 is a diagram illustrating the HMD device of FIG. 1.

Referring to FIG. 5, an HMD device 200 may include a display part 220, a housing 240, and a mounting part 260.

The HMD device 200 may be disposed (e.g., mounted) on a user's head. The HMD device 200 may provide an (e.g., display) an image (e.g., image information) to the user. The display part 220 may display an image based on an image signal. The display part 220 may provide the images to the user's left eye (e.g., a left-eye image) and to the user's right eye (e.g., a right-eye image). The left-eye image corresponding to the user's left eye and the right-eye image corresponding to the user's right eye may be the same. In other exemplary embodiments, the left-eye image corresponding to the user's left eye of and the user and a right right-eye image corresponding to the user's right eye of the user may be the same. In an alternative exemplary embodiment, the left eye image corresponding to the left eye of the user and the right eye image corresponding to the right eye of the user may be different from each other. The HMD device 200 may provide a two dimensional ("2D") image, a three dimensional ("3D") image, a virtual reality image, a 360-degree panorama image, etc. to the display part 220.

The display part 220 may include at least one of an LCD device, an OLED device, and a flexible display device. The display part 220 may be located in (e.g., accommodated in) the housing 240 or be combined with (e.g., integral with) the housing 240. The display part 220 may receive a command (e.g., data, power, etc.) through an interface included in the housing 240.

The housing 240 may be disposed in a front of the eyes of the user. The housing 240 may include composition elements for driving the HMD device 200. In an exemplary embodiment, the housing 240 of the HMD device 200 may include a wireless communication device, an interface, a memory, a power supply, etc., for example. The wireless communication device may wirelessly receive the image signal from an external device. In an exemplary embodiment, the wireless communication device may communicate with the external device by various communication methods such as Bluetooth, Radio Frequency Identification ("RFID"), Infrared Data Association ("IrDA"), ZigBee, Near Field Communication ("NFC"), Wireless-Fidelity ("Wi-Fi"), Ultra Wideband ("UWB"), etc. The interface may couple the HMD device 200 to the external device. In an exemplary embodiment, the HMD device 200 may receive external power from the external device by (e.g., through) the interface, for example. The memory may store data that supports a various function of the HMD device 200. In an exemplary embodiment, the memory may store data for an operating of a various application programs or applications driven in the HMD device 200, for example. The power supply may provide the power to each of the composition elements of the HMD device 200 by receiving external power or internal power. In an exemplary embodiment, the power supply may be (or may include) an embedded battery or a replaceable battery, for example.

The mounting part 260 may be coupled to the housing 240. The HMD device 200 may be disposed (e.g., mounted) on the user's head by the mounting part 260. In an exemplary embodiment, the mounting part 260 may be implemented as a belt or an elastic band, for example.

Figure 6:
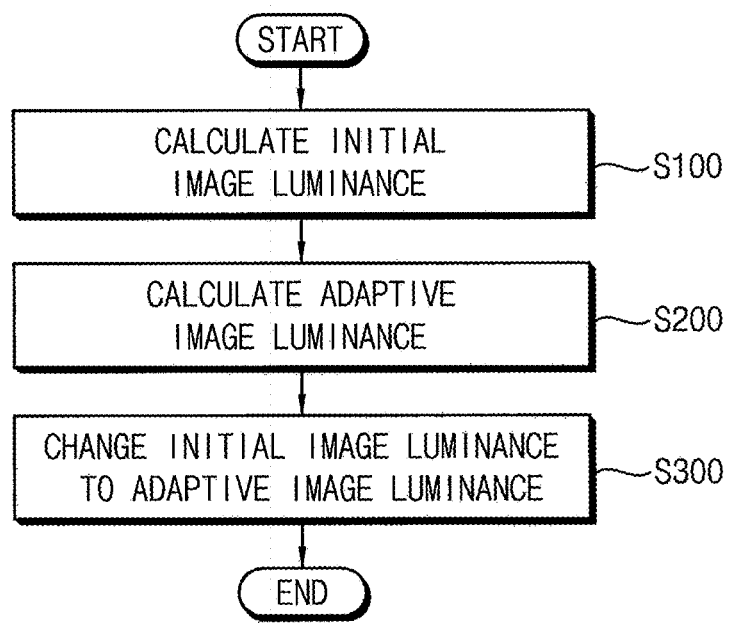
FIG. 6 is a flowchart illustrating an exemplary embodiment of a driving method of an HMD device.

FIG. 6 is a flowchart illustrating a driving method of an MID device according to exemplary embodiments.

Referring to FIG. 6, a driving method of the HMD device may include an operation S100 of calculating an initial image luminance of an image based on an equation "log(Lth)=$c_1$ log(La)+$c_2$ log(w)+$c_3$, where Lth is a determination luminance, La is an adaptive environment luminance, w is an offset, c1 is a first constant, c2 is a second constant, and c3 is a third constant" that is a modelling for a relation of an adaptive environment luminance in which eyes of a user adapted and a determination luminance in which the eyes of the user do not recognize a discomfort, an operation S200 of calculating a watching image luminance of the image based on an equation "log(Lth)=$c_1$ log(La)+$c_2$ log(w)+$c_3$", and an operation S300 of changing the initial image luminance to the watching image luminance during an adaptive time.

The driving method of the HMD device may calculate the initial image luminance of the image (operation S100). The adaptive environment luminance of the Equation 1 represents a luminance of an environment to which the eyes of the user is adapted and the determination luminance represents a luminance in which the user does not recognize the discomfort. The Equation 1 is the modelling for the relation of the adaptive environment luminance and the determination luminance based on a discomfort threshold at which the user feels the discomfort or does not adapted to the luminance change. The HMD device may calculate the initial image luminance of the image displayed on the display part immediately after the user wears the HMD device. In some exemplary embodiments, the driving method of the HMD device may further include an operation of measuring an intensity of luminance of a surrounding environment using a sensor. The driving method of the HMD device may determine the determination luminance calculated by adapting the intensity of luminance of the surrounding environment measured by the sensor to the adaptive environment luminance of the Equation 1 as the initial image luminance. Further, the driving method of the HMD device may adapt the first constant, the second constant, and the third constant of the initial image luminance described in the Chart 1 to the Equation 1. Thus, the driving method of the HMD device may calculate the initial image luminance based on the Equation 2. In other exemplary embodiments, the driving method of the HMD device may further include an operation of receiving a selection signal of the user who selects one of the plurality of the user luminance. The driving method of the HMD device may determine the determination luminance calculated by adapting the user luminance corresponding to the selection signal to the adaptive environment luminance of the Equation 1 as the initial image luminance. Further, the driving method of the HMD device may adapt the first constant, the second constant, and the third constant of the initial image luminance described in the Chart 1 to the Equation 1. Thus, the driving method of the HMD device may calculate the initial image luminance based on the Equation 3.

The driving method of the HMD device may calculate the watching image luminance of the image (operation S200). The watching image luminance represents luminance of the image displayed on the display part of the HMD device after a predetermined adaptive time. The driving method of the HMD device may determine the determination luminance calculated by adapting the initial image luminance to the adaptive environment luminance as the watching image luminance as the watching image luminance. Further, the driving method of the HMD device may adapt the first constant, the second constant, and the third constant of the watching image luminance described in the Chart 1 to the Equation 1. Thus, the driving method of the HMD device may calculate the watching image luminance based on the Equation 4.

The driving method of the HMD device may change the initial image luminance to the watching image luminance during the adaptive time (operation S300). The driving method of the HMD device may display the image having the initial image luminance on the display part and sequentially change the initial image luminance to the watching image luminance during the adaptive time. The user may not recognize the discomfort occurs by a rapid change of the luminance by changing the initial image luminance to the watching image luminance during the adaptive time.

As described above, the driving method of the HMD device may calculate the initial image luminance based on the intensity of luminance of the surround environment or the user luminance, calculate the watching image luminance based on the initial image luminance, and change the luminance of the image displayed on the display part from the initial image luminance to the watching image luminance during the adaptive time. Thus, the discomfort and the fatigue of the eyes of the user may decrease.

The invention may be applied to a display device and an electronic device including the display device. In an exemplary embodiment, the invention may be applied to various devices such as a computer monitor, a laptop, a digital camera, a cellular phone, a smart phone, a smart pad, a television, a personal digital assistant ("PDA"), a portable multimedia player ("PMP"), a MP3 player, a navigation system, a game console, a video phone, etc.

The foregoing is illustrative of exemplary embodiments and is not to be construed as limiting thereof. Although a few exemplary embodiments have been described, those skilled in the art will readily appreciate that many modifications are possible in the exemplary embodiments without materially departing from the novel teachings and advantages of the invention. Accordingly, all such modifications are intended to be included within the scope of the invention as defined in the claims. Therefore, it is to be understood that the foregoing is illustrative of various exemplary embodiments and is not to be construed as limited to the specific exemplary embodiments disclosed, and that modifications to the disclosed exemplary embodiments, as well as other exemplary embodiments, are intended to be included within the scope of the appended claims.

What is claimed is:

1. A head mount display device comprising:
a display panel which displays image based on an image signal;
a calculator which calculates an initial image luminance and a watching image luminance based on an equation "$\log(Lth)=c_1 \log(La)+c_2 \log(w)+c_3$, where Lth is a determination luminance, La is an adaptive environment luminance, w is an offset, c1 is a first constant, c2 is a second constant, and c3 is a third constant" which is a modelling for a relationship of an adaptive environment luminance in which eyes of a user are adapted and a determination luminance in which the eyes of the user do not recognize a discomfort; and
a luminance controller which changes the initial image luminance of the image to the watching image luminance during an adaptive time.

2. The head mount display device of claim 1, further comprising:
a sensor which measures an intensity of luminance of a surrounding environment.

3. The head mount display device of claim 2, wherein the calculator calculates the initial image luminance based on the intensity of the luminance of the surrounding environment measured from the sensor.

4. The head mount display device of claim 3, wherein the calculator determines the determination luminance calculated by adapting the intensity of the luminance to the adaptive environment luminance as the initial image luminance.

5. The head mount display device of claim 3, wherein the calculator calculates the initial image luminance based on an equation "$\log(L1)=0.904 \log(Le)+0.16 \log(w)+0.07$, where L1 is the initial image luminance, Le is the intensity of the luminance of the surrounding environment".

6. The head mount display device of claim 1, further comprising:
a luminance determiner which stores a plurality of user luminance and receive a selection signal of the user who selects one of the user luminance.

7. The head mount display device of claim 6, wherein the calculator calculates the initial image luminance based on the one of user luminance selected by the user.

8. The head mount display device of claim 7, wherein the calculator determines the determination luminance calculated by adapting the user luminance to the adaptive environment luminance as the initial image luminance.

9. The head mount display device of claim 7, wherein the calculator calculates the initial image luminance based on an equation "$\log(L1)=0.904 \log(Lu)+0.16 \log(w)+0.07$, where L1 is the initial image luminance, Lu is the user luminance".

10. The head mount display device of claim 1, further comprising:
a timing controller coupled to the luminance controller, wherein the timing controller stores a plurality of gamma data sets.

11. The head mount display device of claim 10, wherein the timing controller selects at least one gamma data set based on a luminance control signal output from the luminance controller.

12. The head mount display device of claim 10, wherein the plurality of gamma data sets is stored as a lookup table.

13. The head mount display device of claim 10, wherein the timing controller counts the adaptive time based on a vertical synchronization signal.

14. The head mount display device of claim 1, wherein the calculator determines the determination luminance calculated by adapting the initial image luminance to the adaptive environment luminance as the watching image luminance.

15. The head mount display device of claim 14, wherein the calculator calculates the watching image luminance based on an equation "$\log(L2)=0.547 \log(L1)+0.15 \log(w)+1.09$, where L2 is the watching image luminance, L1 is the initial image luminance.

16. The head mount display device of claim 1, wherein the adaptive time is less than about 2 minutes.

17. A driving method of a head mount display device comprising:
calculating an initial image luminance of an image based on an equation "$\log(Lth)=c_1 \log(La)+c_2 \log(w)+c_3$, where Lth is a determination luminance, La is an adaptive environment luminance, w is an offset, c1 is a first constant, c2 is a second constant, and c3 is a third constant" which is a modelling for a relation of an adaptive environment luminance in which eyes of a user adapted and a determination luminance in which the eyes of the user do not recognize a discomfort;
calculating a watching image luminance of the image based on the equation "$\log(Lth)=c_1 \log(La)+c_2 \log(w)+c_3$"; and
changing the initial image luminance to the watching image luminance during an adaptive time.

18. The driving method of claim 17, further comprising:
measuring an intensity of luminance of a surrounding environment,
wherein the initial image luminance is calculated based on an equation "$\log(L1)=0.904 \log(Le)+0.16 \log(w)+0.07$, where L1 is the initial image luminance, Le is the intensity of the luminance of the surrounding environment".

19. The driving method of claim 17, further comprising:
receiving a user luminance selected by a user,
wherein the initial image luminance is calculated based on an equation "$\log(L1)=0.904 \log(Lu)+0.16 \log(w)+0.07$, where L1 is the initial image luminance, Lu is the user luminance".

20. The driving method of claim 17, wherein the watching image luminance is calculated based on an equation "$\log(L2)=0.547 \log(L1)+0.15 \log(w)+1.09$, where L2 is the watching image luminance, L1 is the initial image luminance".

* * * * *